(12) United States Patent
Shah et al.

(10) Patent No.: US 7,930,377 B2
(45) Date of Patent: Apr. 19, 2011

(54) METHOD AND SYSTEM FOR USING BOOT SERVERS IN NETWORKS

(75) Inventors: Shishir Shah, Irvine, CA (US); Edward C McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1166 days.

(21) Appl. No.: 10/957,465

(22) Filed: Oct. 1, 2004

(65) Prior Publication Data
US 2006/0047852 A1    Mar. 2, 2006

Related U.S. Application Data

(60) Provisional application No. 60/565,060, filed on Apr. 23, 2004.

(51) Int. Cl.
*G06F 15/16* (2006.01)
(52) U.S. Cl. ........................................ 709/222
(58) Field of Classification Search .......... 709/212–217, 709/220–222; 711/112; 713/2
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schlichte | 179/15 |
| 4,200,929 A | 4/1980 | Davidjuk et al. | |
| 4,258,418 A | 3/1981 | Heath | |
| 4,268,906 A | 5/1981 | Bourke et al. | |
| 4,333,143 A | 6/1982 | Calder | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,449,182 A | 5/1984 | Rubinson | |
| 4,475,192 A | 10/1984 | Fernow et al. | |
| 4,546,468 A | 10/1985 | Christmas et al. | 370/54 |
| 4,549,263 A | 10/1985 | Calder | |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,777,595 A | 10/1988 | Strecker et al. | |

(Continued)

FOREIGN PATENT DOCUMENTS
EP    0649098    9/1994

(Continued)

OTHER PUBLICATIONS

Budruk, Ravi et al., "PCI Express System Architecture", (2004)434, 436-439,442-443.

(Continued)

*Primary Examiner* — William C Vaughn, Jr.
*Assistant Examiner* — Scott Christensen
(74) *Attorney, Agent, or Firm* — Klein, O'Neill & Singh, LLP

(57) ABSTRACT

A method and system for booting a server and/or server blade in a network is provided. The system includes, a boot server that is used to store plural WWPNs, an active profile for the server and a boot schedule, wherein a HBA registers a default WWPN and/or HBA profile with the boot server and if the HBA is configured to boot using a management application, the boot server provides a WWPN to the HBA. The management application includes, a graphical user interface for creating a LUN for a storage system and assigning the LUN to be a boot LUN, wherein the graphical user interface can access a boot server for booting a server.

15 Claims, 13 Drawing Sheets

U.S. PATENT DOCUMENTS

| | | | |
|---|---|---|---|
| 4,783,730 A | 11/1988 | Fischer | |
| 4,783,739 A | 11/1988 | Calder | |
| 4,803,622 A | 2/1989 | Bain, Jr. et al. | |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,129,064 A | 7/1992 | Fogg, Jr. et al. | |
| 5,144,622 A | 9/1992 | Takiyasu et al. | 370/85.13 |
| 5,151,899 A | 9/1992 | Thomas et al. | |
| 5,212,795 A | 5/1993 | Hendry | |
| 5,249,279 A | 9/1993 | Schmenk et al. | |
| 5,258,751 A | 11/1993 | DeLuca et al. | |
| 5,260,933 A | 11/1993 | Rouse | |
| 5,260,935 A | 11/1993 | Turner | |
| 5,276,807 A | 1/1994 | Kodama et al. | |
| 5,280,483 A | 1/1994 | Kamoi et al. | |
| 5,291,481 A | 3/1994 | Doshi et al. | |
| 5,321,816 A | 6/1994 | Rogan et al. | |
| 5,339,311 A | 8/1994 | Turner | |
| 5,347,638 A | 9/1994 | Desai et al. | |
| 5,367,520 A | 11/1994 | Cordell | 370/60 |
| 5,371,861 A | 12/1994 | Keener et al. | |
| 5,390,173 A | 2/1995 | Spinney et al. | |
| 5,425,022 A | 6/1995 | Clark et al. | |
| 5,448,702 A | 9/1995 | Garcia, Jr. et al. | |
| 5,528,591 A | 6/1996 | Lauer | |
| 5,537,400 A | 7/1996 | Diaz et al. | |
| 5,568,165 A | 10/1996 | Kimura | |
| 5,568,167 A | 10/1996 | Galbi et al. | |
| 5,568,614 A | 10/1996 | Mendelson | |
| 5,579,443 A | 11/1996 | Tatematsu et al. | |
| 5,588,000 A | 12/1996 | Rickard | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,633,867 A | 5/1997 | Ben-Nun et al. | |
| 5,638,518 A | 6/1997 | Malladi | |
| 5,647,057 A | 7/1997 | Roden et al. | |
| 5,664,197 A | 9/1997 | Kardach et al. | |
| 5,666,483 A | 9/1997 | McClary | |
| 5,671,365 A | 9/1997 | Binford et al. | |
| 5,677,909 A | 10/1997 | Heide | |
| 5,687,172 A | 11/1997 | Cloonan et al. | 370/395 |
| 5,687,387 A | 11/1997 | Endejan et al. | |
| 5,701,416 A | 12/1997 | Thorson et al. | |
| 5,706,279 A | 1/1998 | Teraslinna | |
| 5,729,762 A | 3/1998 | Kardach et al. | |
| 5,732,206 A | 3/1998 | Mendel | |
| 5,740,467 A | 4/1998 | Chmielecki, Jr. et al. | |
| 5,748,612 A | 5/1998 | Stoevhase et al. | 370/230 |
| 5,751,710 A | 5/1998 | Crowther et al. | |
| 5,757,771 A | 5/1998 | Li et al. | |
| 5,758,187 A | 5/1998 | Young | |
| 5,761,427 A | 6/1998 | Shah et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,828,903 A | 10/1998 | Sethuram et al. | |
| 5,835,496 A | 11/1998 | Yeung et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,875,343 A | 2/1999 | Binford et al. | |
| 5,881,296 A | 3/1999 | Williams et al. | |
| 5,892,604 A | 4/1999 | Yamanaka et al. | |
| 5,892,969 A | 4/1999 | Young | |
| 5,894,560 A | 4/1999 | Carmichael et al. | |
| 5,905,905 A | 5/1999 | Dailey et al. | |
| 5,917,723 A | 6/1999 | Binford | |
| 5,925,119 A | 7/1999 | Maroney | |
| 5,936,442 A | 8/1999 | Liu et al. | |
| 5,954,796 A | 9/1999 | McCarty et al. | |
| 5,968,143 A | 10/1999 | Chisholm et al. | |
| 5,974,547 A * | 10/1999 | Klimenko | 713/2 |
| 5,978,359 A | 11/1999 | Caldara et al. | |
| 5,978,379 A | 11/1999 | Chan et al. | |
| 5,983,292 A | 11/1999 | Nordstrom et al. | |
| 5,987,028 A | 11/1999 | Yang et al. | 370/380 |
| 5,999,528 A | 12/1999 | Chow et al. | 370/365 |
| 6,006,340 A | 12/1999 | O'Connell | |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,049,802 A | 4/2000 | Waggener, Jr. et al. | |
| 6,055,603 A | 4/2000 | Ofer et al. | |
| 6,055,618 A | 4/2000 | Thorson | |
| 6,061,360 A | 5/2000 | Miller et al. | |
| 6,061,785 A | 5/2000 | Chiarot et al. | |
| 6,078,970 A | 6/2000 | Nordstrom et al. | |
| 6,081,512 A | 6/2000 | Muller et al. | 370/256 |
| 6,085,277 A | 7/2000 | Nordstrom et al. | |
| 6,105,122 A | 8/2000 | Muller et al. | |
| 6,108,738 A | 8/2000 | Chambers et al. | |
| 6,108,778 A | 8/2000 | LaBerge | |
| 6,115,761 A | 9/2000 | Daniel et al. | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,134,617 A | 10/2000 | Weber | |
| 6,138,176 A | 10/2000 | McDonald et al. | |
| 6,144,668 A | 11/2000 | Bass et al. | |
| 6,147,976 A | 11/2000 | Shand et al. | |
| 6,148,421 A | 11/2000 | Hoese et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,185,620 B1 | 2/2001 | Weber et al. | |
| 6,201,787 B1 | 3/2001 | Baldwin et al. | |
| 6,209,089 B1 * | 3/2001 | Selitrennikoff et al. | 713/2 |
| 6,229,822 B1 | 5/2001 | Chow et al. | |
| 6,230,276 B1 | 5/2001 | Hayden | |
| 6,233,244 B1 | 5/2001 | Runaldue et al. | |
| 6,240,096 B1 | 5/2001 | Book | |
| 6,252,891 B1 | 6/2001 | Perches | |
| 6,253,267 B1 | 6/2001 | Kim et al. | |
| 6,269,413 B1 | 7/2001 | Sherlock | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,289,386 B1 | 9/2001 | Vangemert | |
| 6,301,612 B1 * | 10/2001 | Selitrennikoff et al. | 709/220 |
| 6,307,857 B1 | 10/2001 | Yokoyama et al. | |
| 6,308,220 B1 | 10/2001 | Mathur | 709/238 |
| 6,310,884 B1 | 10/2001 | Odenwald, Jr. | |
| 6,311,204 B1 | 10/2001 | Mills et al. | |
| 6,314,477 B1 | 11/2001 | Cowger et al. | |
| 6,324,181 B1 | 11/2001 | Wong et al. | 370/403 |
| 6,327,625 B1 | 12/2001 | Wang et al. | |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,339,813 B1 | 1/2002 | Smith et al. | |
| 6,343,324 B1 | 1/2002 | Hubis et al. | |

| | | | |
|---|---|---|---|
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,408,349 B1 | 6/2002 | Castellano | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,425,021 B1 | 7/2002 | Ghodrat et al. | |
| 6,425,034 B1 | 7/2002 | Steinmetz et al. | |
| 6,434,630 B1 | 8/2002 | Micalizzi, Jr. et al. | |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,463,032 B1 | 10/2002 | Lau et al. | |
| 6,467,008 B1 | 10/2002 | Gentry, Jr. et al. | 710/261 |
| 6,470,007 B1 | 10/2002 | Berman | |
| 6,470,026 B1 | 10/2002 | Pearson et al. | |
| 6,480,500 B1 | 11/2002 | Erimli et al. | |
| 6,484,173 B1 | 11/2002 | O'Hare et al. | |
| 6,502,189 B1 | 12/2002 | Westby | |
| 6,504,846 B1 | 1/2003 | Yu et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,546,010 B1 | 4/2003 | Merchant et al. | |
| 6,553,036 B1 | 4/2003 | Miller et al. | |
| 6,563,796 B1 | 5/2003 | Saito | |
| 6,564,271 B2 | 5/2003 | Micalizzi, Jr. et al. | |
| 6,570,850 B1 | 5/2003 | Gutierrez et al. | |
| 6,570,853 B1 | 5/2003 | Johnson et al. | |
| 6,591,302 B2 | 7/2003 | Boucher et al. | |
| 6,594,231 B1 | 7/2003 | Byham et al. | |
| 6,594,329 B1 | 7/2003 | Susnow | |
| 6,597,691 B1 | 7/2003 | Anderson et al. | 370/360 |
| 6,597,777 B1 | 7/2003 | Ho | |
| 6,606,690 B2 * | 8/2003 | Padovano | 711/148 |
| 6,614,796 B1 | 9/2003 | Black et al. | |
| 6,622,206 B1 | 9/2003 | Kanamaru et al. | |
| 6,625,157 B2 | 9/2003 | Niu et al. | |
| 6,629,161 B2 | 9/2003 | Matsuki et al. | |
| 6,643,298 B1 | 11/2003 | Brunheroto et al. | |
| 6,643,748 B1 | 11/2003 | Wieland | |
| 6,647,019 B1 | 11/2003 | McKeown et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,700,877 B1 | 3/2004 | Lorenz et al. | |
| 6,718,497 B1 | 4/2004 | Whitby-Strevens | |
| 6,721,799 B1 | 4/2004 | Slivkoff | |
| 6,725,388 B1 | 4/2004 | Susnow | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,765,871 B1 | 7/2004 | Knobel et al. | |
| 6,775,693 B1 | 8/2004 | Adams | |
| 6,779,083 B2 | 8/2004 | Ito et al. | |
| 6,785,241 B1 | 8/2004 | Lu et al. | |
| 6,807,181 B1 | 10/2004 | Weschler | |
| 6,810,440 B2 | 10/2004 | Micalizzi, Jr. et al. | |
| 6,810,442 B1 | 10/2004 | Lin et al. | |
| 6,816,492 B1 | 11/2004 | Turner et al. | |
| 6,816,750 B1 | 11/2004 | Klaas | |
| 6,839,747 B1 | 1/2005 | Blumenau et al. | |
| 6,859,435 B1 | 2/2005 | Lee et al. | |
| 6,865,155 B1 | 3/2005 | Wong et al. | |
| 6,865,157 B1 | 3/2005 | Scott et al. | |
| 6,886,141 B1 | 4/2005 | Kunz et al. | |
| 6,888,831 B1 | 5/2005 | Hospodor et al. | |
| 6,901,072 B1 | 5/2005 | Wong | |
| 6,904,053 B1 | 6/2005 | Berman | |
| 6,904,507 B2 | 6/2005 | Gil | |
| 6,922,408 B2 | 7/2005 | Bloch et al. | |
| 6,928,470 B1 | 8/2005 | Hamlin | |
| 6,928,533 B1 | 8/2005 | Eisen et al. | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,947,393 B2 | 9/2005 | Hooper, III | |
| 6,952,659 B2 | 10/2005 | King et al. | |
| 6,968,463 B2 | 11/2005 | Pherson et al. | |
| 6,975,627 B1 | 12/2005 | Parry et al. | |
| 6,980,525 B2 | 12/2005 | Banks et al. | |
| 6,983,342 B2 | 1/2006 | Helenic et al. | |
| 6,987,768 B1 | 1/2006 | Kojima et al. | |
| 6,988,130 B2 * | 1/2006 | Blumenau et al. | 709/213 |
| 6,988,149 B2 * | 1/2006 | Odenwald | 709/250 |
| 7,000,025 B1 | 2/2006 | Wilson | |
| 7,002,926 B1 | 2/2006 | Eneboe et al. | |
| 7,010,607 B1 | 3/2006 | Bunton | |
| 7,024,410 B2 | 4/2006 | Ito et al. | |
| 7,031,615 B2 | 4/2006 | Genrile | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,051,182 B2 * | 5/2006 | Blumenau et al. | 711/202 |
| 7,055,068 B2 | 5/2006 | Riedl | |
| 7,061,862 B2 | 6/2006 | Horiguchi et al. | |
| 7,061,871 B2 | 6/2006 | Sheldon et al. | |
| 7,076,569 B1 | 7/2006 | Bailey et al. | |
| 7,082,126 B2 | 7/2006 | Ain et al. | |
| 7,092,374 B1 | 8/2006 | Gubbi | |
| 7,110,394 B1 | 9/2006 | Chamdani et al. | |
| 7,120,728 B2 | 10/2006 | Krakirian et al. | |
| 7,123,306 B2 | 10/2006 | Goto et al. | |
| 7,124,169 B2 | 10/2006 | Shimozono et al. | |
| 7,150,021 B1 | 12/2006 | Vajjhala et al. | |
| 7,151,778 B2 | 12/2006 | Zhu et al. | |
| 7,155,553 B2 | 12/2006 | Lueck et al. | |
| 7,165,152 B2 | 1/2007 | Blumenau et al. | |
| 7,167,929 B2 | 1/2007 | Steinmetz et al. | |
| 7,171,050 B2 | 1/2007 | Kim | |
| 7,185,062 B2 | 2/2007 | Lolayekar et al. | |
| 7,187,688 B2 | 3/2007 | Garmire et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,200,610 B1 | 4/2007 | Prawdiuk et al. | |
| 7,209,478 B2 | 4/2007 | Rojas et al. | |
| 7,215,680 B2 | 5/2007 | Mullendore et al. | |
| 7,221,650 B1 | 5/2007 | Cooper et al. | |
| 7,230,549 B1 | 6/2007 | Woodral et al. | |
| 7,230,929 B2 | 6/2007 | Betker et al. | |
| 7,231,560 B2 | 6/2007 | Lai et al. | |
| 7,233,570 B2 | 6/2007 | Gregg | |
| 7,233,985 B2 * | 6/2007 | Hahn et al. | 709/222 |
| 7,239,641 B1 | 7/2007 | Banks et al. | |
| 7,245,613 B1 | 7/2007 | Winkles et al. | |
| 7,245,627 B2 | 7/2007 | Goldenberg et al. | |
| 7,248,580 B2 | 7/2007 | George et al. | |
| 7,254,206 B2 | 8/2007 | Chiang | |
| 7,263,593 B2 | 8/2007 | Honda et al. | |
| 7,266,286 B2 | 9/2007 | Tanizawa et al. | |
| 7,269,131 B2 | 9/2007 | Cashman et al. | |
| 7,269,168 B2 | 9/2007 | Roy et al. | |
| 7,275,103 B1 | 9/2007 | Thrasher et al. | |
| 7,277,431 B2 | 10/2007 | Walter et al. | |
| 7,287,063 B2 * | 10/2007 | Baldwin et al. | 709/216 |
| 7,292,593 B1 | 11/2007 | Winkles et al. | |
| 7,310,389 B2 | 12/2007 | Waschura et al. | |
| 7,315,511 B2 | 1/2008 | Morita et al. | |
| 7,319,669 B1 | 1/2008 | Kunz et al. | |
| 7,327,680 B1 | 2/2008 | Kloth | |
| 7,334,046 B1 | 2/2008 | Betker | |
| 7,346,707 B1 | 3/2008 | Erimli | |
| 7,349,399 B1 | 3/2008 | Chen et al. | |
| 7,352,701 B1 | 4/2008 | Kunz | |
| 7,352,740 B2 | 4/2008 | Hammons et al. | |
| 7,362,702 B2 | 4/2008 | Terrell et al. | |

| | | |
|---|---|---|
| 7,397,788 B2 | 7/2008 | Mies et al. |
| 7,406,034 B1 | 7/2008 | Cometto et al. |
| 7,406,092 B2 | 7/2008 | Dropps et al. |
| 7,424,533 B1 | 9/2008 | Di Benedetto et al. |
| 7,443,794 B2 | 10/2008 | George et al. |
| 7,460,534 B1 | 12/2008 | Bellenger |
| 7,466,700 B2 | 12/2008 | Dropps et al. |
| 7,471,691 B2 | 12/2008 | Black et al. |
| 7,492,780 B1 | 2/2009 | Goolsby |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. ............. 370/392 |
| 2001/0043564 A1 | 11/2001 | Bloch et al. |
| 2002/0016838 A1 | 2/2002 | Geluc et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124102 A1 | 9/2002 | Kramer et al. |
| 2002/0124124 A1 | 9/2002 | Matsumoto et al. |
| 2002/0147560 A1 | 10/2002 | Devins et al. |
| 2002/0147802 A1 | 10/2002 | Murotani et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1* | 12/2002 | Blumenau et al. ........... 709/213 |
| 2003/0002516 A1 | 1/2003 | Boock et al. |
| 2003/0012200 A1 | 1/2003 | Salamat |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0037159 A1 | 2/2003 | Zhao et al. |
| 2003/0046396 A1 | 3/2003 | Richter et al. |
| 2003/0056000 A1 | 3/2003 | Mullendore et al. |
| 2003/0056032 A1 | 3/2003 | Micalizzi, Jr. et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1* | 6/2003 | Coatney et al. ............. 709/217 |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1* | 7/2003 | Chang ............. 709/222 |
| 2003/0126320 A1 | 7/2003 | Liu et al. |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0152076 A1 | 8/2003 | Lee et al. |
| 2003/0161429 A1 | 8/2003 | Chiang |
| 2003/0169740 A1 | 9/2003 | Harris et al. |
| 2003/0172149 A1 | 9/2003 | Edsall et al. |
| 2003/0172239 A1* | 9/2003 | Swank ............. 711/163 |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............ 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terrell et al. |
| 2003/0191883 A1 | 10/2003 | April |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0024831 A1 | 2/2004 | Yang et al. |
| 2004/0027989 A1 | 2/2004 | Martin et al. |
| 2004/0028038 A1 | 2/2004 | Anderson et al. |
| 2004/0042458 A1 | 3/2004 | Elzu |
| 2004/0054776 A1 | 3/2004 | Klotz et al. |
| 2004/0054866 A1* | 3/2004 | Blumenau et al. ............ 711/202 |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biran et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0107389 A1 | 6/2004 | Brown et al. |
| 2004/0109418 A1 | 6/2004 | Fedorkow et al. |
| 2004/0120340 A1 | 6/2004 | Furey et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ............ 370/463 |
| 2004/0151188 A1 | 8/2004 | Maveli et al. |
| 2004/0153526 A1* | 8/2004 | Haun et al. ............. 709/217 |
| 2004/0153566 A1 | 8/2004 | Lalsangi et al. |
| 2004/0153863 A1 | 8/2004 | Klotz et al. |
| 2004/0153914 A1 | 8/2004 | El-Batal |
| 2004/0160957 A1 | 8/2004 | Coffman |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0025152 A1 | 2/2005 | Georgiou et al. |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0058148 A1 | 3/2005 | Castellano et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0141661 A1 | 6/2005 | Renaud et al. |
| 2005/0177641 A1 | 8/2005 | Yamagami |
| 2005/0188245 A1 | 8/2005 | Seto et al. |
| 2005/0198523 A1 | 9/2005 | Shanbhag et al. |
| 2005/0286526 A1 | 12/2005 | Sood et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0095607 A1 | 5/2006 | Lim et al. |
| 2006/0107260 A1 | 5/2006 | Motta |
| 2006/0123298 A1 | 6/2006 | Tseng |
| 2006/0143300 A1 | 6/2006 | See et al. |
| 2006/0156083 A1 | 7/2006 | Jang et al. |
| 2006/0184711 A1 | 8/2006 | Pettey |
| 2006/0203725 A1 | 9/2006 | Paul et al. |
| 2006/0209735 A1 | 9/2006 | Evoy |

| | | | |
|---|---|---|---|
| 2006/0253757 A1 | 11/2006 | Brink et al. | |
| 2006/0268887 A1 | 11/2006 | Lu et al. | |
| 2006/0274744 A1 | 12/2006 | Nagai et al. | |
| 2007/0011534 A1 | 1/2007 | Boudon et al. | |
| 2007/0124623 A1 | 5/2007 | Tseng | |
| 2007/0177701 A1 | 8/2007 | Thanigasalam | |
| 2007/0206502 A1 | 9/2007 | Martin et al. | |
| 2007/0262891 A1 | 11/2007 | Woodral et al. | |

FOREIGN PATENT DOCUMENTS

| | | |
|---|---|---|
| EP | 0738978 | 10/1996 |
| EP | 0856969 | 1/1998 |
| EP | 1059588 | 12/2000 |
| WO | WO 95/06286 | 3/1995 |
| WO | WO 98/36537 | 8/1998 |
| WO | WO 00/58843 | 10/2000 |
| WO | WO-01/95566 | 12/2001 |
| WO | WO 03/088050 | 10/2003 |

OTHER PUBLICATIONS

"PCI Express Base Specification Revision 1.0", (Apr. 29, 2002), 195-196.

"Examination Report from the European Patent Office dated Oct. 12, 2007 for European Application No. 05 805 632.6".

Qlogic SANsurfer VDS Manager, by Tim Lustig and Keith Hageman; QLOGIC Publication—Mar. 2004.

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Sep. 6, 2007 for U.S. Appl. No. 10/889,337".

Malavalli, et al., "Fibre Channel Framing and Signaling (FC-FS) Rev 1.10", *NCITS working draft proposed American National Standard for Information Technology*, (Jan. 25, 2001).

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Office Action from the USPTO dated Jan. 4, 2008 for U.S. Appl. No. 11/039,189".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

Brown, Douglas W., "A State-Machine Synthesizer", *18th Design Automation Conference*, (1981),301-305.

Banks, David C., at al., "Link Trunking and Measuring Link Latency in Fibre Channel Fabric", U.S. Appl. No. 60/286,046, 1-52.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric" Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "Lun Security Considerations for Storage Area Networks," Hitachi Data Systems Paper - Xp 002185193 (1999), pp. 1-7.

Claudio DeSanti, "Virtual Fabrics Switch Support" ; VF Switch Support, T11/04-395v2. Sep. 2004, pp. 1-15.

Pelissier et al, "Inter-Fabric Routing" , dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture" , Presentation by Brocade to T11/03-369V0 dated Jun. 2, 2003.

U.S. Appl. No. 10/266,360, filed Oct. 7, 2002, Method And System For Reducing Congestion In Computer Networks.

U.S. Appl. No. 10/241,153, filed Sep. 11, 2002, Zone Mangement In A Multi-Module Fibre Channel Switch.

U.S. Appl. No. 10/263,858, filed Oct. 2003/2002, Method And System For Using Distributed Name Servers In Multi-Module Fibre Channel Switching.

U.S. Appl. No. 10/212,425, filed Aug. 5, 2002, Method And System For Flexible Routing In A Fibre Channel System.

U.S. Appl. No. 10/302,149, filed Nov. 22, 2002, Method And System For Controlling Packet Flow In Networks.
U.S. Appl. No. 10/894,579, filed Jul. 20, 2004, Method and System for Managing Traffic in Fibre Channel Switches.
U.S. Appl. No. 10/894,546, filed Jul. 20, 2004, Method and Sytem for Routing and Filtering Network Data Packets in Fibre Channel Systems.
U.S. Appl. No. 10/894,827, filed Jul. 20, 2004, Method and System for Selecting Virtual Lanes in Fibre Channel Switches.
U.S. Appl. No. 10/894,597, filed Jul. 20, 2004, Programmable Pseudo Virtual Lanes for Fibre Channel Systems.
U.S. Appl. No. 10/894,595, filed Jul. 20, 2004, Method and Sytem for Reducing Latency and Congestion in Fibre Channel Switches.
U.S. Appl. No. 10/664,548, filed Sep. 19, 2003, Buffer to Buffer Credit Recovery for In-Line Fibre Channel Credit Extension Devices.
U.S. Appl. No. 10/891,175, filed Jul. 20, 2004, Method and System for Detecting Congestion and Over Subsciption in a Fibre Channel Network.
U.S. Appl. No. 10/894,492, filed Jul. 20, 2004, LUN Based Hard Zoning in Fibre Channel Switches.
U.S. Appl. No. 10/894,587, filed Jul. 20, 2004, Multi Speed Cut Through Operation in Fibre Channel Switches.
U.S. Appl. No. 10/894,726, filed Jul. 20, 2004, Method and System for Improving Bandwidth & Reducing Idles in Fibre Channel Switches.
U.S. Appl. No. 10/894,629, filed Jul. 20, 2004, Method and System for Routing Fibre Channel Systems.
U.S. Appl. No. 10/894,491, filed Jul. 20, 2004, Method and System for Keeping a Fibre Channel Arbitrated Loop Open During Frame Gaps.
U.S. Appl. No. 10/894,536, filed Jul. 20, 2004, Method And System For Congestion Control Based On Optimum Bandwidth Allocation In A Fibre Channel Switch.
U.S. Appl. No. 10/894,627, filed Jul. 20, 2004, Method and System for Programmable Data Dependent Network Routing.
U.S. Appl. No. 10/719,077, filed Nov. 21, 2003, Method and System for Monitoring Events in Storage Area Networks.
U.S. Appl. No. 10/894,689, filed Jul. 20, 2004, Method and System for Power Control of Fibre Channel Switches.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method And System For Inexpensive And Non-Disruptive Data Capture In Networks.
U.S. Appl. No. 10/889,337, filed Jul. 12, 2004, Method And System For Minimizing Disruption In Common-Access Networks.
U.S. Appl. No. 10/889,259, filed Jul. 12, 2004, Method And Apparatus For Detecting And Removing Orphaned Primitives In A Fibre Channel Network.
U.S. Appl. No. 10/889,267, filed Jul. 12, 2004, Method And System For Fibre Channel Arbitrated Loop Acceleration.
U.S. Appl. No. 10/889,551, filed Jul. 12, 2004, Method And Apparatus For Testing Loop Pathway Integrity In A Fibre Channel Arbitrated Loop.
U.S. Appl. No. 10/889,256, filed Jul. 12, 2004, Method And Apparatus For Accelerating Receive-Modify-Send Frames In A Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method And Apparatus For Improving Buffer Utilization In Communication Networks.
U.S. Appl. No. 10/894,597, filed Jul. 20, 2004, Method And System For Using Extended Fabric Features With Fibre Channel Switch Elements.
U.S. Appl. No. 10/894,978, filed Jul. 20, 2004, Method And System for Programmable Data Dependent.

U.S. Appl. No. 10/894,917, filed Jul. 20, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method And System For Congestion Control In A Fibre Channel Switch.
U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch For Mixed Switch Fabrics.
U.S. Appl. No. 10/956,718, filed Oct. 1, 2004, Method and System for Using an In-Line Credit Extender with a Host Bus Adapter.
Curtis, A. R., "Design Considerations for 10-Gbit Fibre Channel", Curtis A. Ridgeway, Distinguished I/O Architect, Storage and Computing ASIC's Division, LSI Logic Corp.
Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.
Melhem, et al., "Minimizing Wavelength Conversions in WDM Path Establishment", *Computer Science Department*, University of Pittsburgh, Pittsburgh, PA 15260, (2001),197-211.
Ridgeway, Curt, "0GFC-40GFC using 4-lane XAUI's", *LSI Logic Presentation—T11/03-069v0*.
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Fibre Channel Switch Fabric—2(FC-SW-2) Rev 5.4 NCITS Working Draft Proposed American National Standard for Information Technology", T11/Project 1305-D/Rev 5.4, (Jun. 2001).
"Fibre Channel Generic Services—3 (FC-GS-3) Rev. 7.01, NCITS Working Draft Proposed American National Standard for Information Technology,", *T11/Project 1356 D/Rev 7.01*, (Nov. 28, 2000).
"Final Office Action from USPTO dated Apr. 1, 2008 for U.S. Appl. No. 10/956,717".
"Office Action from USPTO dated Apr. 17, 2008 for U.S. Appl. No. 10/894,689".
"Office Action from USPTO dated Jul. 25, 2008 for U.S. Appl. No. 10/894,827".
"Notice of Allowance from USPTO dated Jul. 9, 2008 for U.S. Appl. No. 10/894,629".
"Office Action from USPTO dated Jun. 26, 2008 for U.S. Appl. No. 10/894,547".
"Notice of Allowance from USPTO dated Jul. 9, 2008 for U.S. Appl. No. 10/894,579".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Jul. 9, 2008 for U.S. Appl. No. 10/894,917".
"Notice of Allowance from USPTO dated Apr. 18, 2008 for U.S. Appl. No. 10/894,597".
"Notice of Allowance from USPTO dated Apr. 4, 2008 for U.S. Appl. No. 11/608,634".
"Notice of Allowance from USPTO dated Apr. 9, 2008 for U.S. Appl. No. 11/039,189".
"Notice of Allowance from USPTO dated Apr. 10, 2008 for U.S. Appl. No. 10/241,153".
"Office Action from USPTO dated Apr. 11, 2008 for U.S. Appl. No. 10/894,595".

"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Office Action from USPTO dated May 14, 2008 for U.S. Appl. No. 10/956,502".
"Office Action from USPTO dated Apr. 3, 2008 for U.S. Appl. No. 10/894,587".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated Apr. 14, 2008 for U.S. Appl. No. 10/894,627".
"Office Action from USPTO dated May 15, 2008 for U.S. Appl. No. 10/798,527".
"Final Office Action from USPTO dated May 21, 2008 for U.S. Appl. No. 10/889,635".
"Office Action from USPTO dated May 27, 2008 for U.S. Appl. No. 10/956,955".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 27, 2008 for U.S. Appl. No. 0/894,726".
"Notice of Allowance from USPTO dated Jul. 17, 2008 for U.S. Appl. No. 10/894,536".
"Office Action from USPTO dated Sep. 18, 2008 for U.S. Appl. No. 10/894,978".
"Office Action from USPTO dated Sep. 23, 2008 for U.S. Appl. No. 12/031,585".
"Project-T11/1619-D/Rev. 0.50", *Information technology Industry Council, Fibre Channel: Framing and Signaling-2, Dec. 2004, Rev. 0.50*, (Dec. 2004),76, 81,114, 115.
"Notice of Allowance from the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798 527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 2, 2008 for U.S. Appl. No. 10/956,955".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
Final Office Action from USPTO dated Jan. 26, 2009 for U.S. Appl. No. 10/895,175.
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 8, 2009 for U.S. Appl. No. 10/956,955".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".

"Final Office Action from USPTO dated Nov. 10, 2009 for U.S. Appl. No. 11/057,912".
"Office Action from USPTO dated Dec. 2, 2009 for U.S. Appl. No. 12/141,519".
"Office Action from China State Intellectual Property Office dated Dec. 11, 2009 for Chinese Application No. 200580032948.4".
"Office Action from USPTO dated Jan. 6, 2010 for U.S. Appl. No. 10/956,501".
"Office Action from State Intellectual Property Office dated Dec. 4, 2009 for Chinese Application No. 200580032947.X".
"Notice of Allowance from USPTO dated Jan. 12, 2010 for U.S. Appl. No. 10/956,955".
"Notice of Allowance from USPTO dated Jan. 21, 2010 for U.S. Appl. No. 10/894,547".
"Office Action from USPTO dated Jan. 26, 2010 for U.S. Appl. No. 10/956,501".
"Final Office Action from USPTO dated Feb. 12, 2010 for U.S. Appl. No. 10/894,732".
"Office Action from USPTO dated Mar. 29, 2010 for U.S. Appl. No. 12/189,502".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application. No. 200580032948.4".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application. No. 200580032947.X".
"Office Action from USPTO dated Jun. 10, 2010 for U.S. Appl. No. 12/259,197".
"Office Action from USPTO dated Mar. 20, 2008 for U.S. Appl. No. 10/894,732".
"Office Action from USPTO dated Feb. 12, 2008 for U.S. Appl. No. 11/057,912".
"Notice of Allowance from USPTO dated Feb. 8, 2008 for U.S. Appl. No. 10/894,529".
"Office Action from USPTO dated Mar. 5, 2008 for U.S. Appl. No. 10/889,259".
"Office Action from USPTO dated Mar. 7, 2008 for U.S. Appl. No. 10/894,629".

* cited by examiner

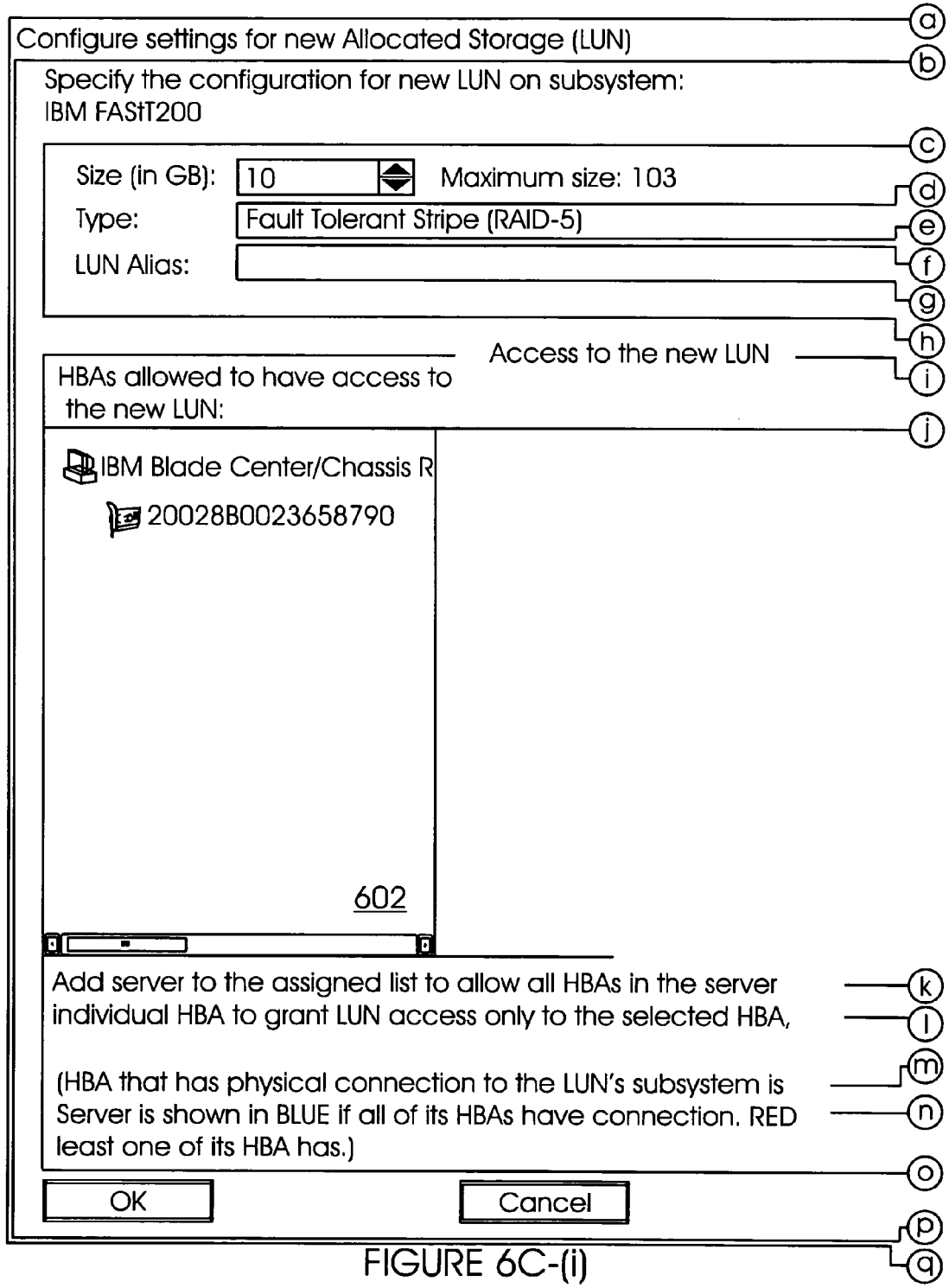
FIGURE 6C-(i)

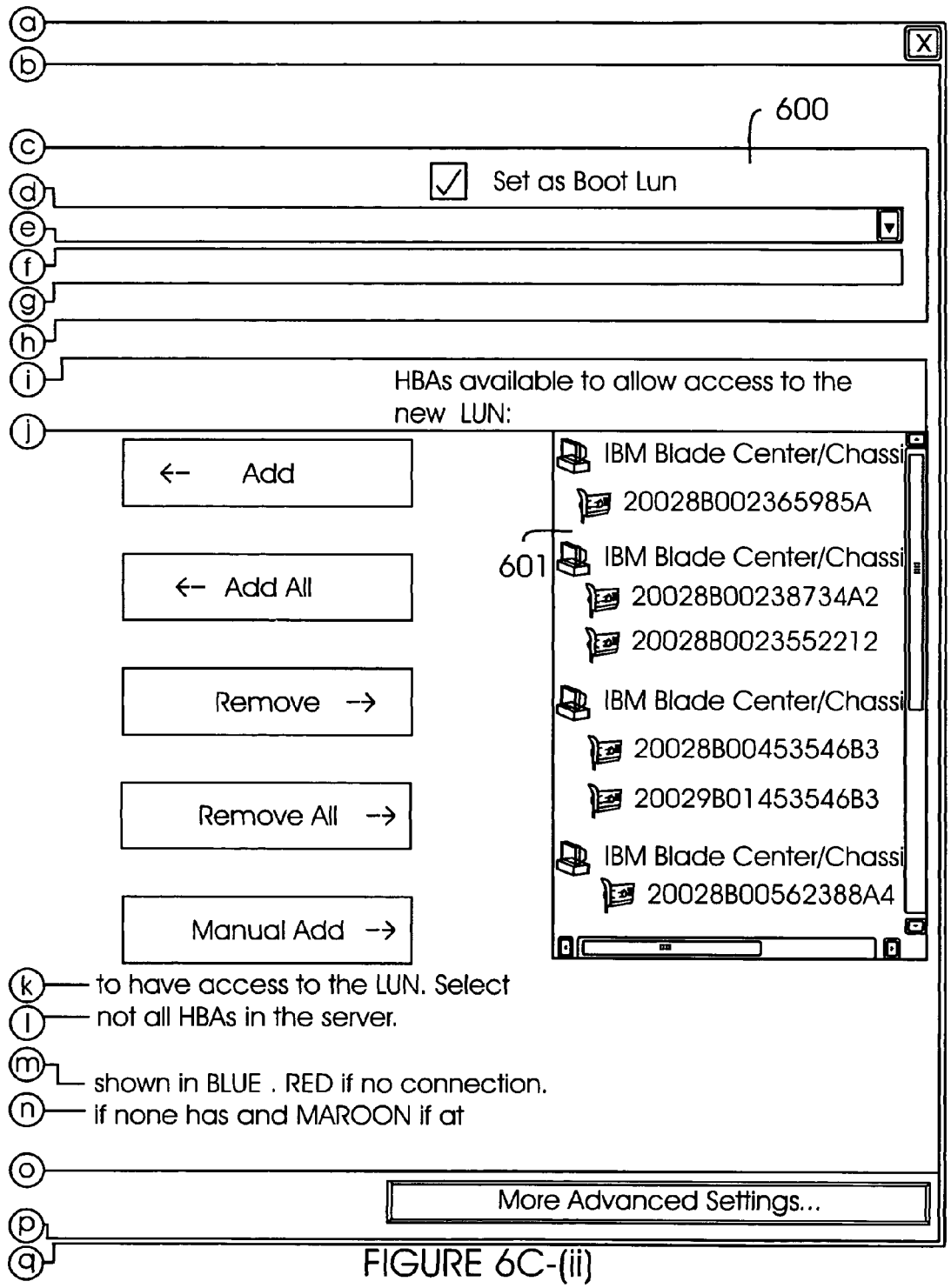
FIGURE 6C-(ii)

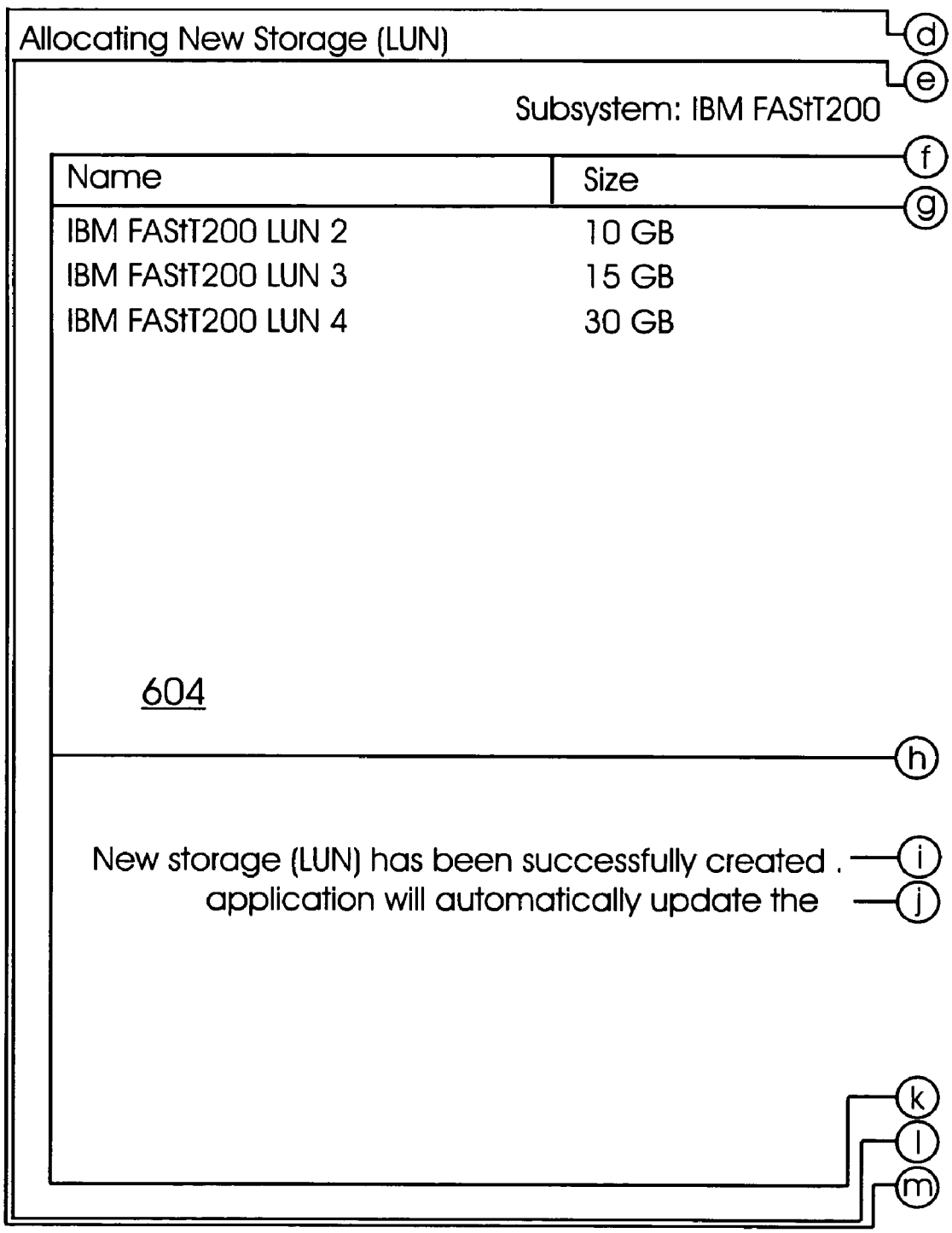
FIGURE 6E-(i)

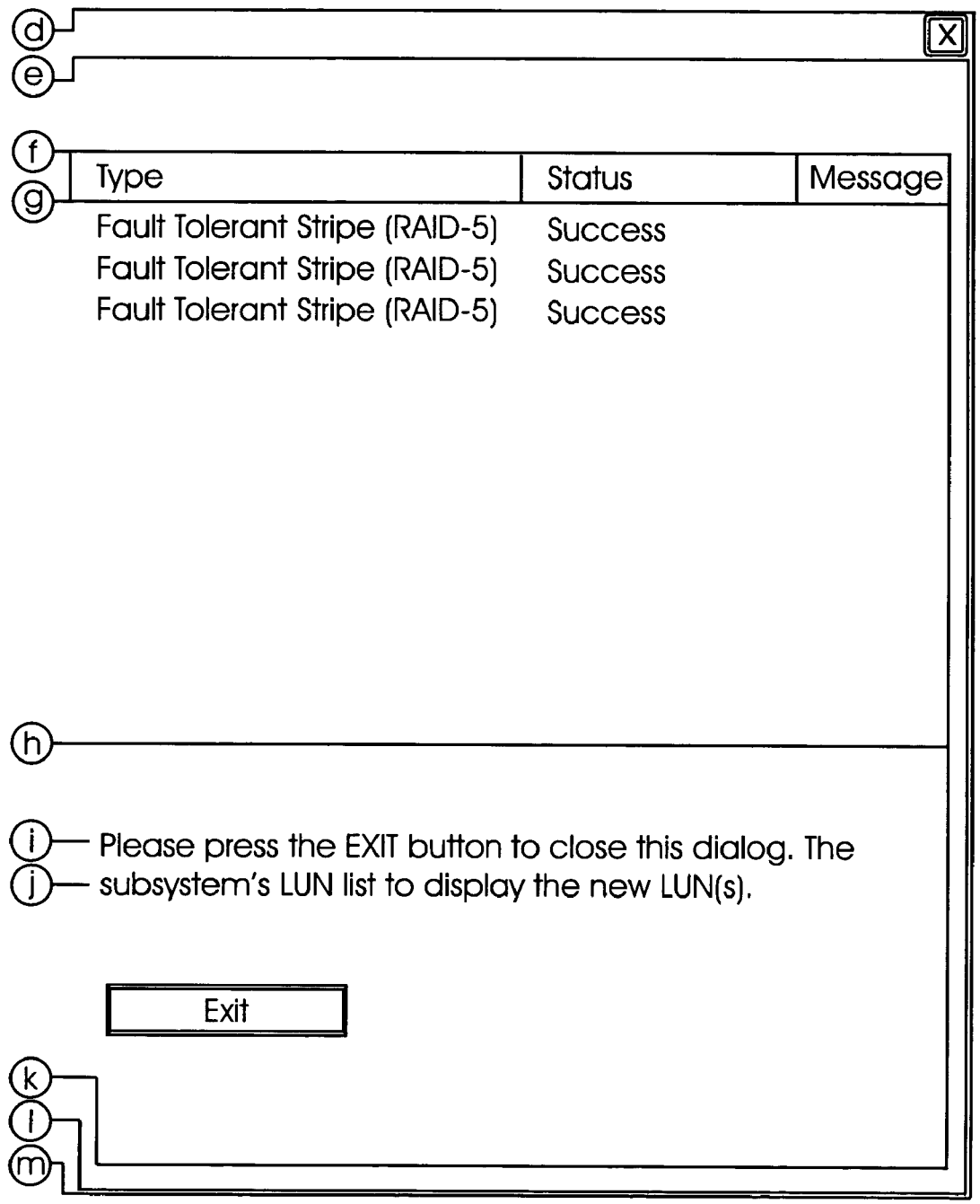
FIGURE 6E-(ii)

METHOD AND SYSTEM FOR USING BOOT SERVERS IN NETWORKS

CROSS REFERENCE TO RELATED APPLICATIONS

This application claims priority. under 35 U.S.C. §119(e)(1) to the provisional patent application, Ser. No. 60/565,060 filed on Apr. 23, 2004, the disclosure of which is incorporated herein by reference in its entirety.

BACKGROUND

1. Field of the Invention

The present invention relates to storage area networks, and more particularly, to managing boot LUNs in a storage area network.

2. Background of the Invention

Storage area networks ("SANs") are commonly used to store and access data. A SAN is a high-speed sub-network of shared storage devices, for example, disks and tape drives. A computer system (may also be referred to as a "host") can access data stored in the SAN.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server. A print server is a computer that manages one or more printers, and a network server is a computer that manages network traffic. A database server is a computer system that processes database queries.

Various components and standard interfaces are used to move data from host systems to storage devices in a SAN. Fibre Channel is one such standard. Fibre Channel (incorporated herein by reference in its entirety) is an American National Standard Institute (ANSI) set of standards, which provides a serial transmission protocol for storage and network protocols such as HIPPI, SCSI (small computer system interface), IP, ATM and others. Fibre Channel provides an input/output interface to meet the requirements of both channel and network users.

Host systems often communicate with storage systems via a host bus adapter ("HBA") using the "PCI" bus interface. PCI stands for Peripheral Component Interconnect, a local bus standard that was developed by Intel Corporation®. The PCI standard is incorporated herein by reference in its entirety. PCI is a 64-bit bus and can run at clock speeds of 33 or 66 MHz.

PCI-X is a standard bus (incorporated herein by reference in its entirety) that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

The iSCSI architecture is based on a client/server model. Typically, the client is a host system such as a file server that issues a read or write command. The server may be a disk array that responds to the client request. Devices that request I/O processes are called initiators. Targets are devices that perform operations requested by initiators. Each target can accommodate up to a certain number of devices, known as logical units, and each is assigned a Logical Unit Number (LUN). LUN(s) throughout this specification means a logical unit number, which is a unique identifier, on a Parallel SCSI or Fiber Channel or iSCSI target.

Boot LUNs are used to boot servers in a SAN environment. In conventional systems, to boot from a Fibre Channel device, each HBA needs to be configured with the name of the boot device. To configure the HBAs, one has to evaluate each server and store either the port name or port identifier and LUN number of the target device.

Conventional systems manually associate a HBA's worldwide port number ("WWPN") provided by the HBA manufacturer to a server blade. The WWPN is manually entered for LUN masking. "CTRL Q" utility is used for each blade's WWPN and to identify boot LUNs. Conventional systems are manual and tedious since boot information is not available at a single point.

The problem becomes worse in a cluster environment. In a clustered environment, the system may be required to boot to different operating system partitions on the same blade, i.e., different boot LUNs have to be enabled for the same blade and the boot LUNs need to be protected from each other.

Conventional systems do not provide an efficient methodology to manage boot LUNs and the boot process itself. Therefore, there is a need for a method and system for efficiently managing the boot process in SANs.

SUMMARY OF THE INVENTION

In one aspect of the present invention, a method for booting a server and/or server blade in a network is provided. The method includes, registering a default world wide port number information ("WWPN") and/or HBA Profile with a boot server; returning a WWPN and/or HBA profile that the server needs to use for booting, wherein a switch returns the WWPN and/or HBA profile; querying the boot server for a list of boot devices; and returning a list of boot devices to the server, wherein the switch returns the list.

The host bus adapter uses the device list to configure a first available boot device from the list. The boot server includes a boot schedule for booting the server.

In yet another aspect of the present invention, a system having a server and a storage system with a switch that allows communication between the server and the storage system is provided. The system includes, a boot server that is used to store plural WWPNs, an active profile for the server and a boot schedule, wherein a HBA registers a default WWPN and/or HBA profile with the boot server and if the HBA is configured to boot using a management application, the boot server provides a WWPN to the HBA.

In yet another aspect of the present invention, a management application for configuring a storage area network is provided. The management application includes, a graphical user interface for creating a LUN for a storage system and assigning the LUN to be a boot LUN, wherein the graphical user interface can access a boot server for booting a server.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 6A-6E show screen shots for a management utility application for setting up a boot LUN, according to one aspect of the present invention.

DETAILED DESCRIPTION OF THE PREFERRED EMBODIMENTS

The following definitions are provided as they are typically (but not exclusively) used in the Fibre Channel environment, implementing the various adaptive aspects of the present invention.

"Blade": A module in a Fibre Channel switch.

"Fibre Channel ANSI Standard": The standard describes the physical interface, transmission and signaling protocol of a high performance serial link for support of other high level protocols associated with IPI, SCSI, IP, ATM and others.

"Fabric": A system which interconnects various ports attached to it and is capable of routing Fibre Channel frames by using destination identifiers provided in FC-2 frame headers.

"Fabric Topology": This is a topology where a device is directly attached to a Fibre Channel fabric that uses destination identifiers embedded in frame headers to route frames through a Fibre Channel fabric to a desired destination.

"Port": A general reference to N. Sub.—Port or F.Sub.—Port.

To facilitate an understanding of the preferred embodiment, the general architecture and operation of a SAN using storage devices will be described. The specific architecture and operation of the preferred embodiment will then be described with reference to the general architecture.

Figure 1A:
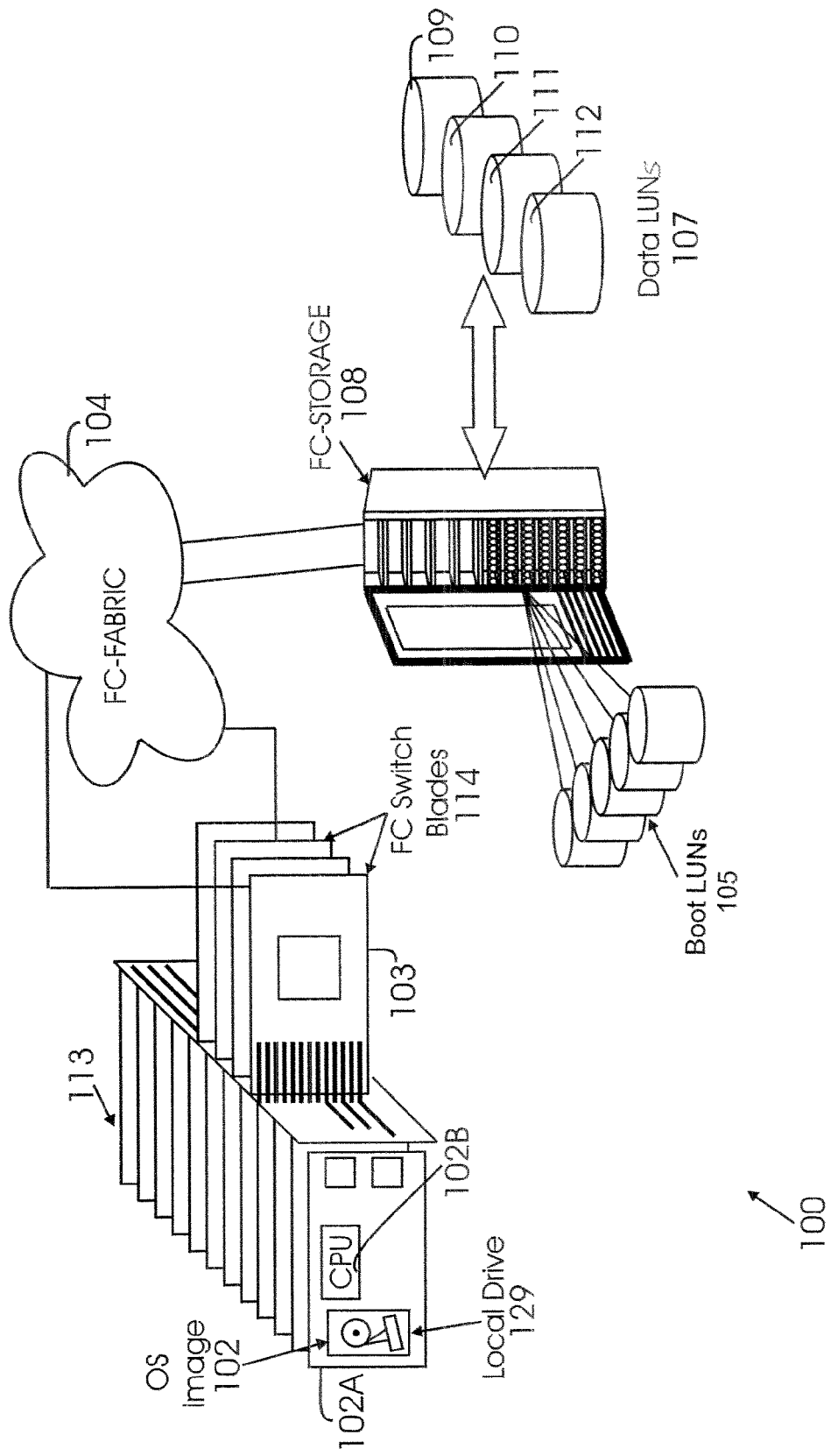
FIGS. 1A and 1B show top-level block diagrams of a SAN.

SAN:

FIG. 1A shows a top-level block diagram of a SAN 100. SAN 100 includes plural server blades 113 coupled to Fibre Channel switch blades 114 (individual Fibre Channel switch blade shown as 103 and may be referred to as a "switch blade 103") that are coupled to a Fibre Channel fabric 104. A single server blade 102A includes local drive (or storage) 129 and a central processing unit 102B.

Storage 129 may store operating system program files(e.g. operating system image 102), application program files (management application 203, according to one aspect of the present invention), and other files. Some of these files are stored on storage 129 using an installation program. For example, CPU 102B executes computer-executable process steps of an installation program so that CPU 102B can properly execute an application program, Storage sub-system (may also be referred to as "FC-Storage") 108 is also coupled to fabric 104 and accessible to server blades 113. Storage sub-system 108 includes plural storage devices (tape drives, disks or any other storage media) 109-112 with Data LUNs 107. Boot LUNs 105 are also coupled to storage sub-system 108 to store boot information.

Figure 1B:
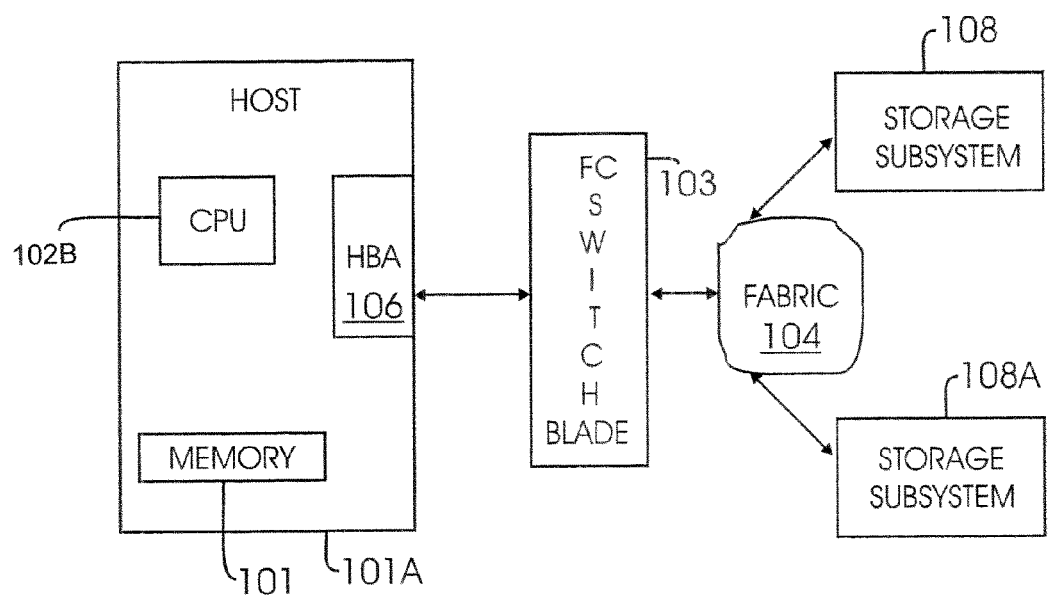

FIG. 1B shows a host system 101A (similar to server blade 102A) with system memory 101. Host system 101A is coupled to storage subsystem 108 and 108A via HBA 106. HBA 106 is operationally coupled to switch blade 103 and fabric 104.

It is noteworthy that host system 101A, as referred to herein, may include a computer, server or other similar devices, which may be coupled to storage systems. Host system 101A can access random access memory ("RAM" for example, memory 101), and read only memory ("ROM") (not shown), and includes other components to communicate with various SAN modules.

When executing stored computer-executable process steps from storage 129, CPU 102B stores and executes the process steps out of RAM. ROM is provided to store invariant instruction sequences such as start-up instruction sequences or basic input/output operating system (BIOS) sequences.

HBA 106 includes various components to facilitate data transfer between server blades and storage sub-systems 108 and 108A. HBA 106 includes processors (may also be referred to as "sequencers") for receive and transmit side, respectively for processing data received from storage sub-systems 108 and 108A and transmitting data to storage sub-systems 108 and 108A. Transmit path in this context means data path from host memory 101 to the storage systems via HBA 106. Receive path means data path from storage sub-system via adapter 106.

Beside dedicated processors on the receive and transmit path, HBA 106 also includes a central processor, which may be a reduced instruction set computer ("RISC") for performing various functions.

HBA 106 also includes Fibre Channel interface (also referred to as Fibre Channel protocol manager "FPM") in receive and transmit paths, respectively to interface with switch blade 103.

HBA 106 is also coupled to an external memory, which is used to move data to and from host 101A. HBA 106 also has non-volatile memory (not shown) to store BIOS information.

Figure 2:
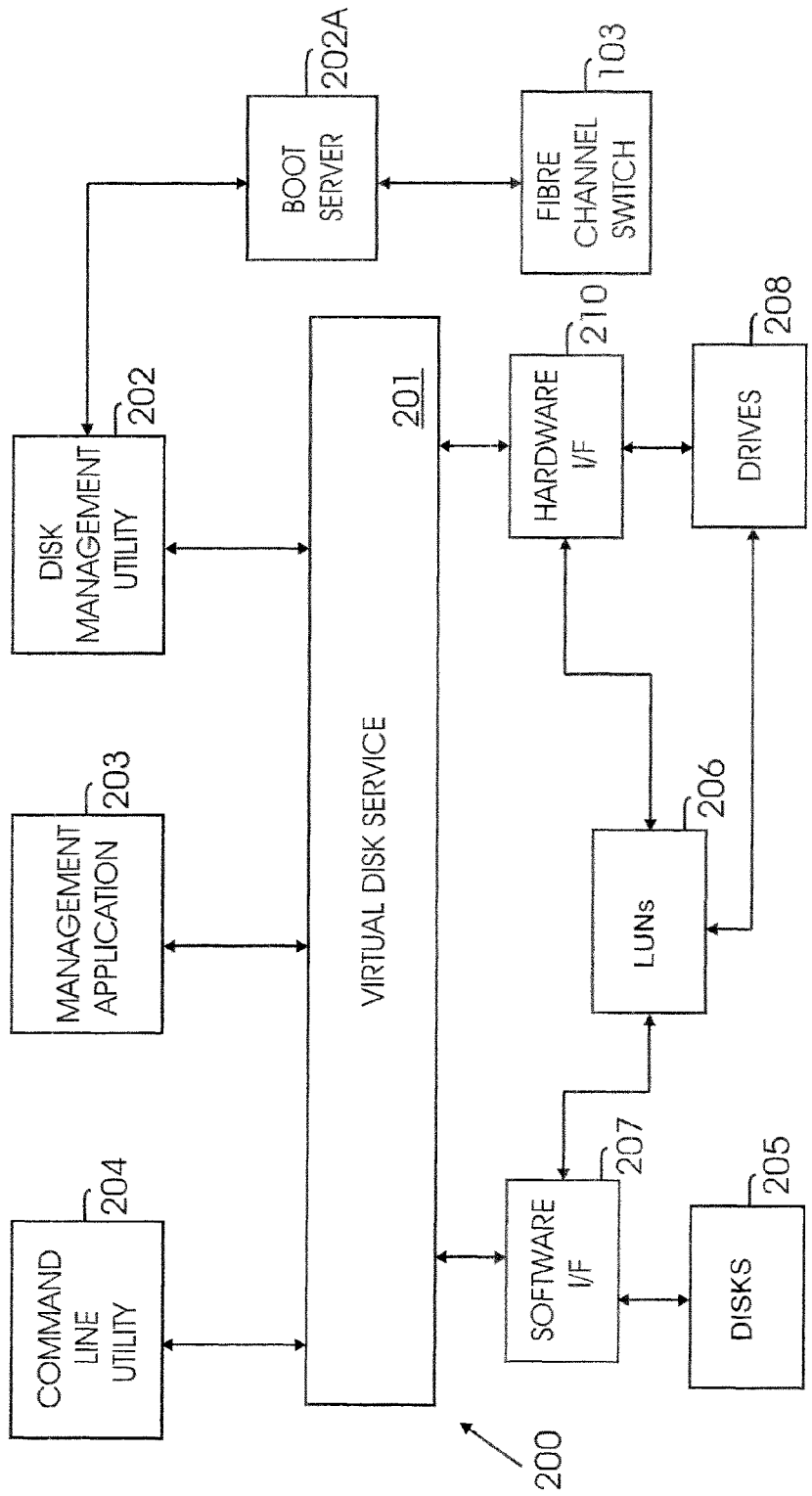
FIG. 2 shows a block diagram of a management utility used according to one aspect of the present invention.

Management Utility Application:

FIG. 2 shows a management utility application that is used for managing boot servers, according to one aspect of the present invention. In one aspect of the present invention, virtual disk service ("VDS") architecture 200 and the storage network industry association ("SNIA") initiative "SMS-S" is used to provide a graphical user interface for efficiently managing storage area networks via management application 203. SMS-S specification, incorporated herein by reference in its entirety, provides a common interface for implementing management functionality.

Microsoft Corporation® that markets Windows Server 2003® and Windows Storage Server 2003® provides a virtual disk service ("VDS") program for managing storage configurations under Microsoft Server Operating Systems.

It is noteworthy that the adaptive aspects of the present invention described herein are not limited to VDS architecture 200 or any industry standard.

VDS architecture 200 includes VDS 201 which is coupled to software interface 207 and hardware interface layer 210 which are coupled to disks 205 and drives 208 respectively. VDS architecture 200 allows storage hardware vendors to write hardware specific code that is then translated into VDS hardware interface 210. Software interface 207 also provides a vendor independent interface.

Disk management utility 202, management application 203 and command line interface utility 204 allow a SAN vendor to use application-programming interfaces ("APIs") to build applications/solutions for managing SANs. Management application 203 may be used to build vendor specific application.

Details of management application 203 for creating and managing LUNs are provided in the provisional patent application Ser. No. 60/565,060. Management application 203 is coupled to a boot server 202A that interfaces with a Fibre Channel switch (for example 103, or switch blades 114). Boot server 202A may be stored in switch blade 103 memory.

Boot server 202A includes a list of WWPN that an HBA can use; S_ID; an active profile of the server that is to be re-booted and a boot schedule when a server(s) needs to be re-booted. The WWPN list maps to a list of boot devices and their associated LUNs.

Boot server 202A also includes information that identifies the server blade in case of bladed server or a server itself. This includes chassis identifier and server blade location and/or system service tag number or a system serial number that uniquely identifies a server. Boot server 202A includes an active boot profile that allows booting a server to a certain system profile.

Management application 203 can query the Fibre Channel switch 103 to find out HBA profiles for the use of a server boot process. Management application 203 programs the Boot device list in the boot server located in the Fibre Channel switch 103 for each HBA profile. A HBA's BIOS logs into boot server 202A and requests the FC switch 103 to provide a list of boot devices configured for its use. Details of using the boot server 202A are provided below.

Fibre Channel Switch Blade 103:

Fibre Channel switches may use multiple modules (also referred to as "blades") connected by Fibre Channel ports. A multi-module switch is integrated as a single switch and appears to other devices in the Fibre Channel fabric as a single switch.

Fibre Channel Switch blade 103 is a Fibre Channel switch module, which is a multi-port device where each port manages a simple point-to-point connection between itself and its attached system. Each port can be attached to a server, peripheral, I/O subsystem, bridge, hub, router, or even another switch. Messages are received from one port and automatically routed to another port. Multiple calls or data transfers happen concurrently.

Fibre Channel switch blade 103 uses memory buffers to hold frames received and sent across a network. Associated with these buffers are credits, which are the number of frames that a buffer can hold per fabric port.

Figure 3B:
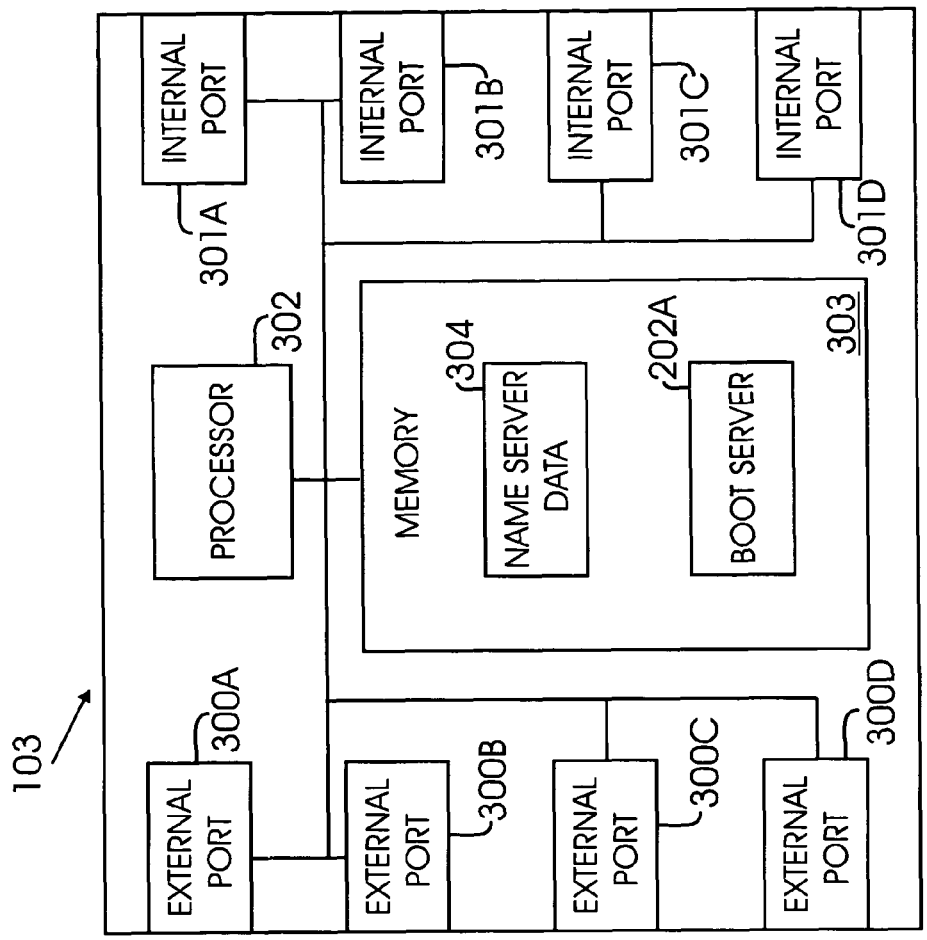
FIG. 3B shows a top-level block diagram for a Fibre Channel switch module.

FIG. 3B shows a top-level block diagram of switch blade 103. Switch blade 103 includes plural external ports (F_Ports operationally coupled to other devices; or E_Ports coupled to other switch modules) 300A through 300D; and internal ports 301A-301D that operate under a multi-blade protocol.

Switch module 103A includes processor 302 to control certain switch functionality. Processor 302 can access memory 303 via a bus (not shown). In one aspect of the present invention, memory 303 can store Name Server data 304 and boot server information 202A.

It is noteworthy that boot server 202A may be located at any other location. The present adaptive aspects of the present invention are not limited to locating the boot server 202A in switch blade 103.

Fibre Channel Generic Services (FC-GS-3) specification describes in section 5.0 various Fibre Channel services that are provided by Fibre Channel switches including using a "Name Server" to discover Fibre Channel devices coupled to a fabric.

A Name server provides a way for N_Ports and NL_Ports to register and discover Fibre Channel attributes. Request for Name server commands are carried over the Common Transport protocol, also defined by FC-GS-3. The Name server information is distributed among fabric elements and is made available to N_Ports and NL_Ports after the ports have logged in.

Various commands are used by the Name Server protocol, as defined by FC-GS-3, for registration, de-registration and queries. Fiber Channel Switched Fabric (FC-SW-2) specification describes how a Fabric consisting of multiple switches implements a distributed Name Server.

Figure 3A:
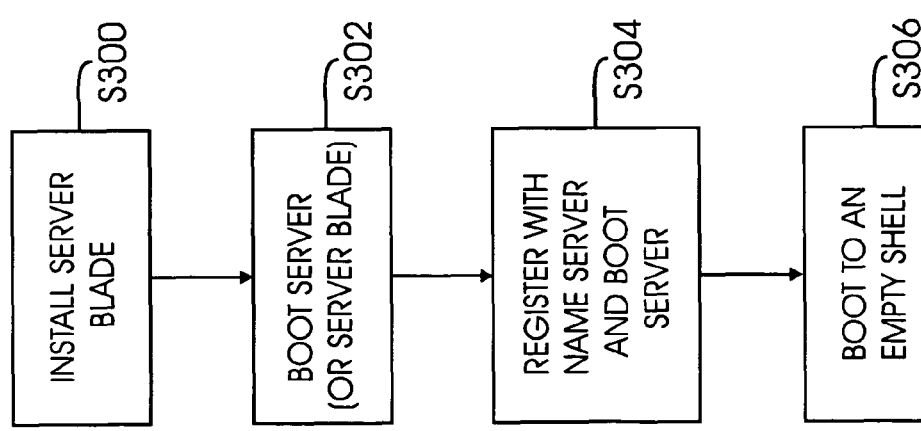
FIG. 3A shows a process flow diagram for installing a server blade, according to one aspect of the present invention.

Process Flow Diagrams:

FIG. 3A shows a process flow diagram for installing a server in a SAN 115. In step S300, a server blade (or the server itself, i.e. host 101A) is installed and the Fibre Channel ports (in HBA 106) are coupled to a Fibre Channel switch (for example, 103).

In step S302, the server (or the server blade in case of bladed servers) is booted. In step S304, the server (via HBA 106 BIOS) registers with Name Server 304 and boot server 202A. The name property includes the default WWPN, Port identifier ("Port ID") and the Server property. The server property includes name, location and serial number of the server blade. In one aspect, HBA 106 BIOS calls into server system BIOS and retrieves the Serial Number of the server chassis and slot location of the server blade (if applicable). HBA 106 may compute a WWPN or use the default WWPN that is provided by the HBA 106 manufacturer and stored in HBA memory (for example, non-volatile random access memory).

In step S306, the server boots to an empty shell, if there is no operating system.

Figure 4:
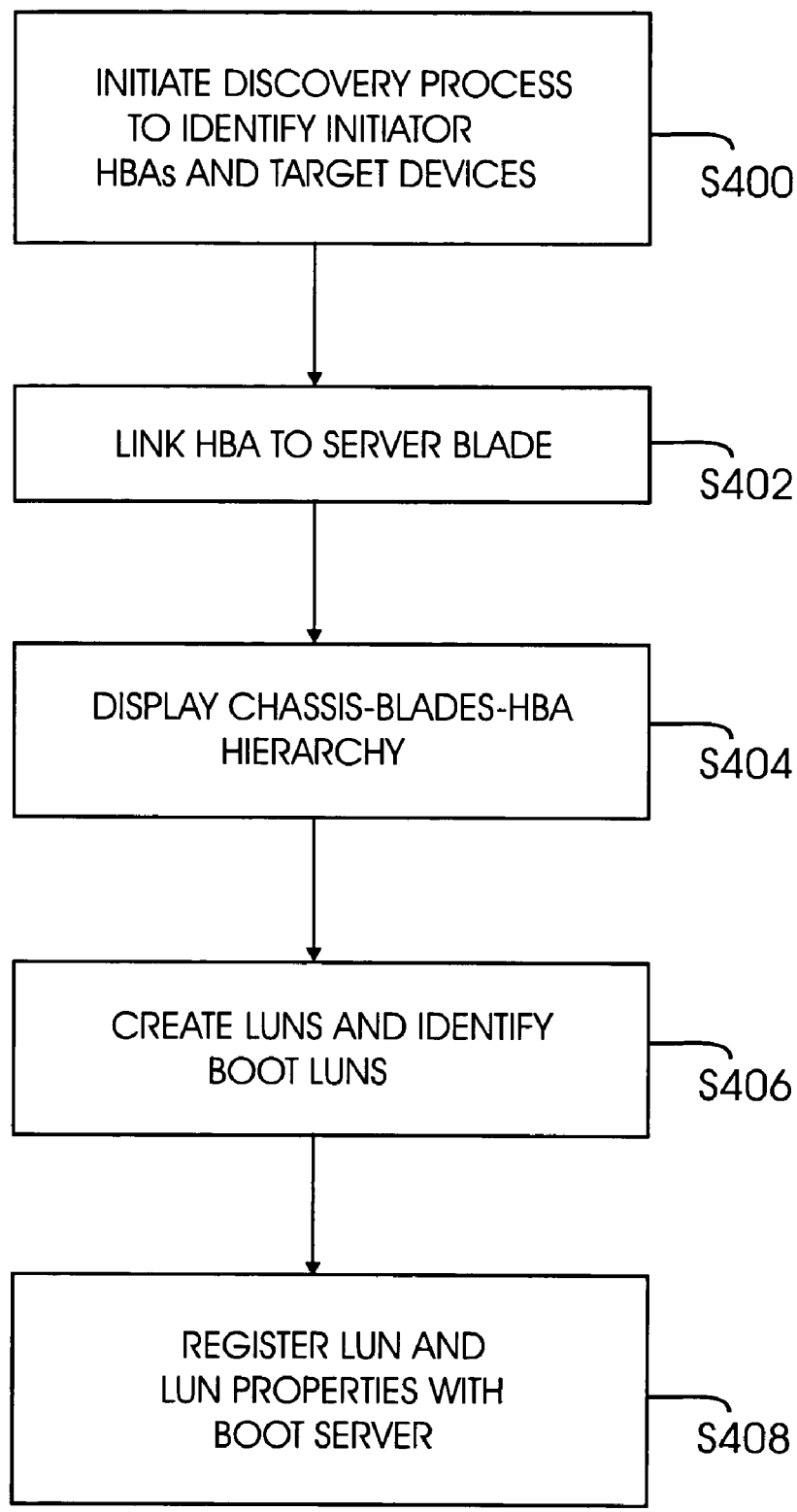
FIG. 4 shows a flow diagram for configuring a SAN, according to one aspect of the present invention.

FIG. 4 shows a flow diagram of process steps for configuring a SAN for proper boot volumes for the servers that are a part of the SAN. In step S400, the process performs a discovery to identify initiator HBAs and target devices through the switch Name Server 304.

In step S402, an HBA is related to a server (or server blade) based on the name property registered with the Boot server 202A under the WWPN of the HBA. In step S404, the hierarchy of the chassis-server blade HBA is displayed. In step S406, management application 203 creates LUNS. A user can specify a LUN to be a boot LUN (600, FIG. 6C).

In step S408, management application 203 registers the boot LUN with the boot server 202A under the WWPN of the HBA.

Figure 5:
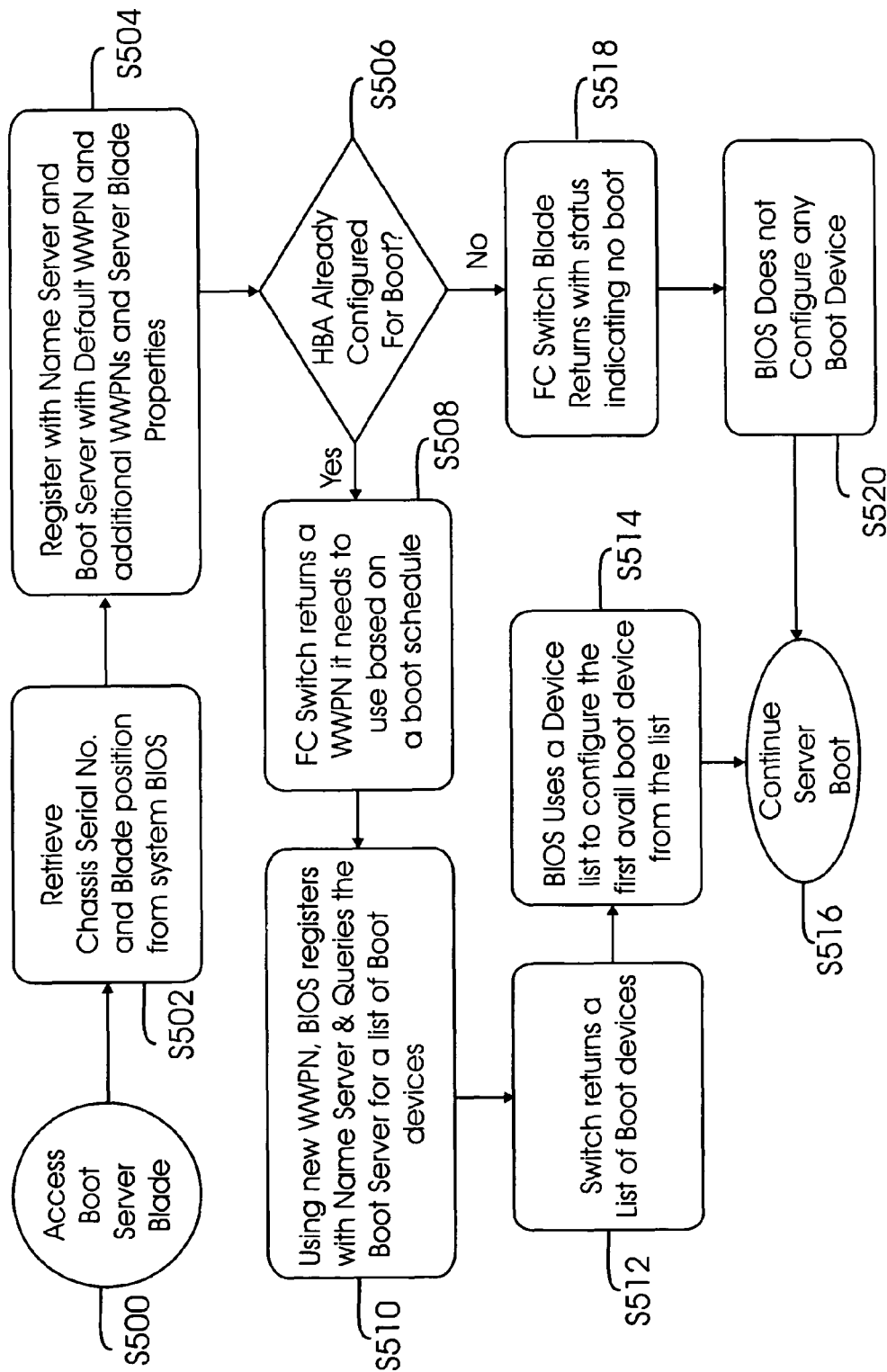
FIG. 5 shows a flow diagram for using a boot server, according to one aspect of the present invention.

Server Re-boot:

FIG. 5 shows a flow diagram for re-booting a server using boot server 202A, according to one aspect of the present invention. The reboot process begins in step S500 by accessing the boot server blade. In step S502, HBA 106 BIOS retrieves the chassis serial number and blade position from server BIOS. In step S504, HBA 106 BIOS in HBA 106 registers itself with the Name Server 304 and boot server 202A with a default WWPN value and server blade properties.

In step S506, the process determines if HBA 106 is already configured for boot. If yes, then in step S508, switch blade 103 returns a WWPN that HBA 106 needs to use based on a boot schedule. In step S510, using the new WWPN, HBA 106 BIOS registers with the Name Server 304 and queries boot server 202A for a list of boot devices. In step S512, Switch 103 returns a list of boot devices. In step S514, HBA 106 BIOS uses a device list to configure the first available boot device from the list. In step S516, the boot process continues.

If in step S506, HBA 106 is not already configured for boot, then in step S518, switch blade 103 returns a status indicating there is no boot. In step S520, HBA 106 BIOS does not configure any boot device. However, since HBA 106 registered with the boot server, the profile information is now accessible to management application 203 for future boot operations.

Figure 6A:
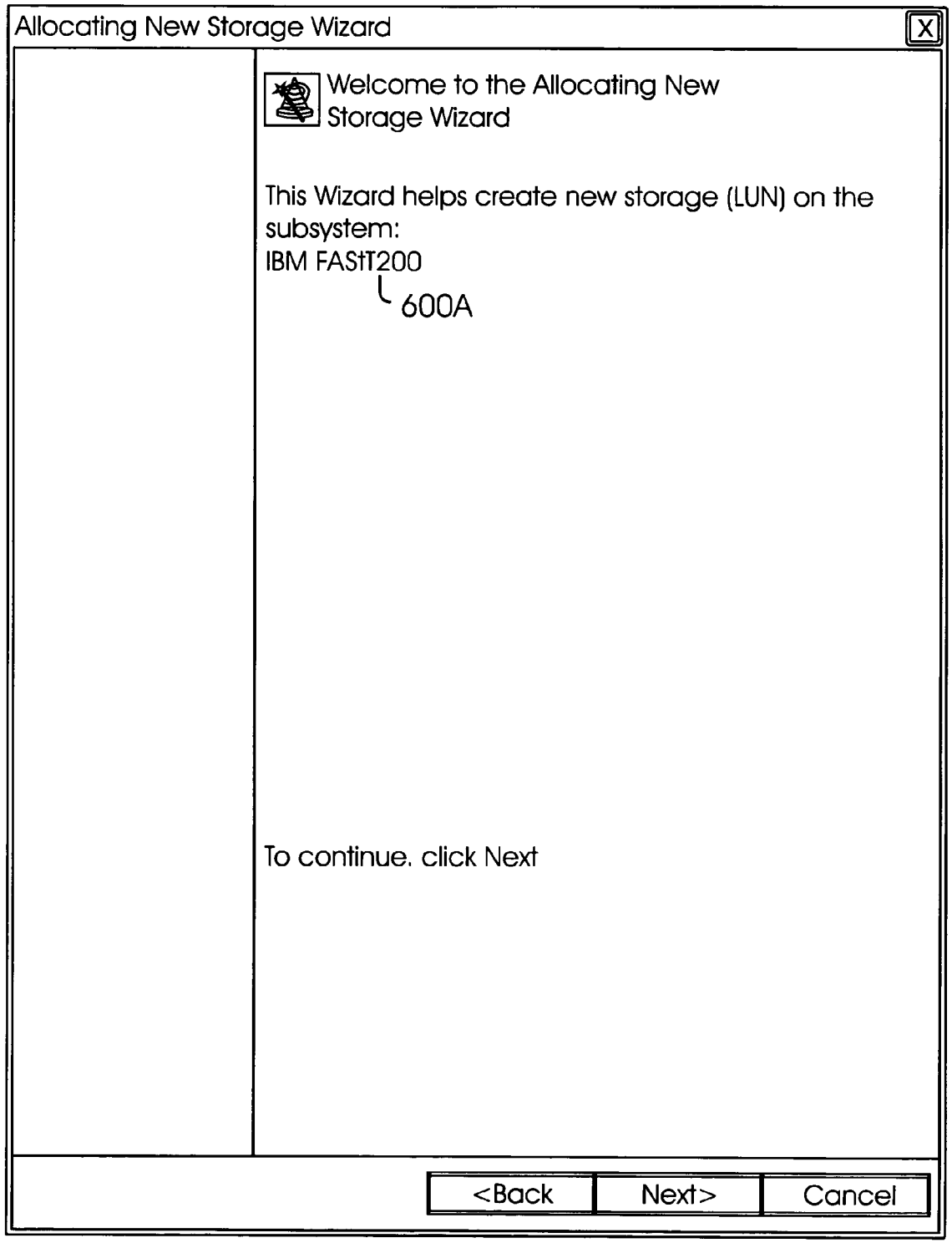
Figure 6B:
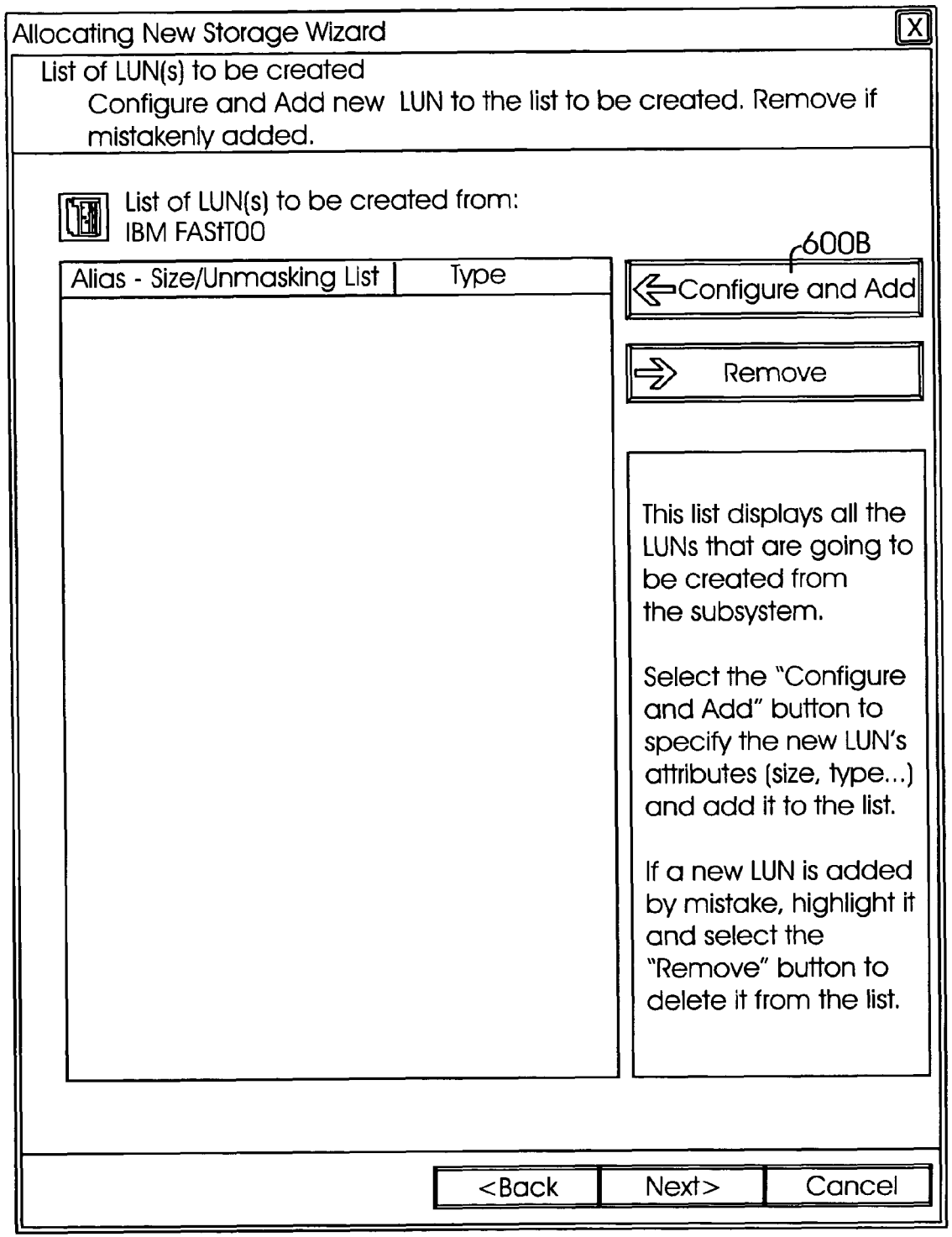

FIGS. 6A-6E show a graphical user interface accessible via management application 203 for creating a boot LUN, according to one aspect of the present invention. FIG. 6A shows a sub-system 600A (IBM FAStT200) for which a LUN is created. FIG. 6B shows a screen shot where the LUN can be configured using the "Configure and Add" option 600B. FIG. 6C shows in window 602 the HBAs that are allowed to access the new LUN. Also, a user can check block 600 to specify the new LUN to be used as a boot LUN.

Figure 6D:
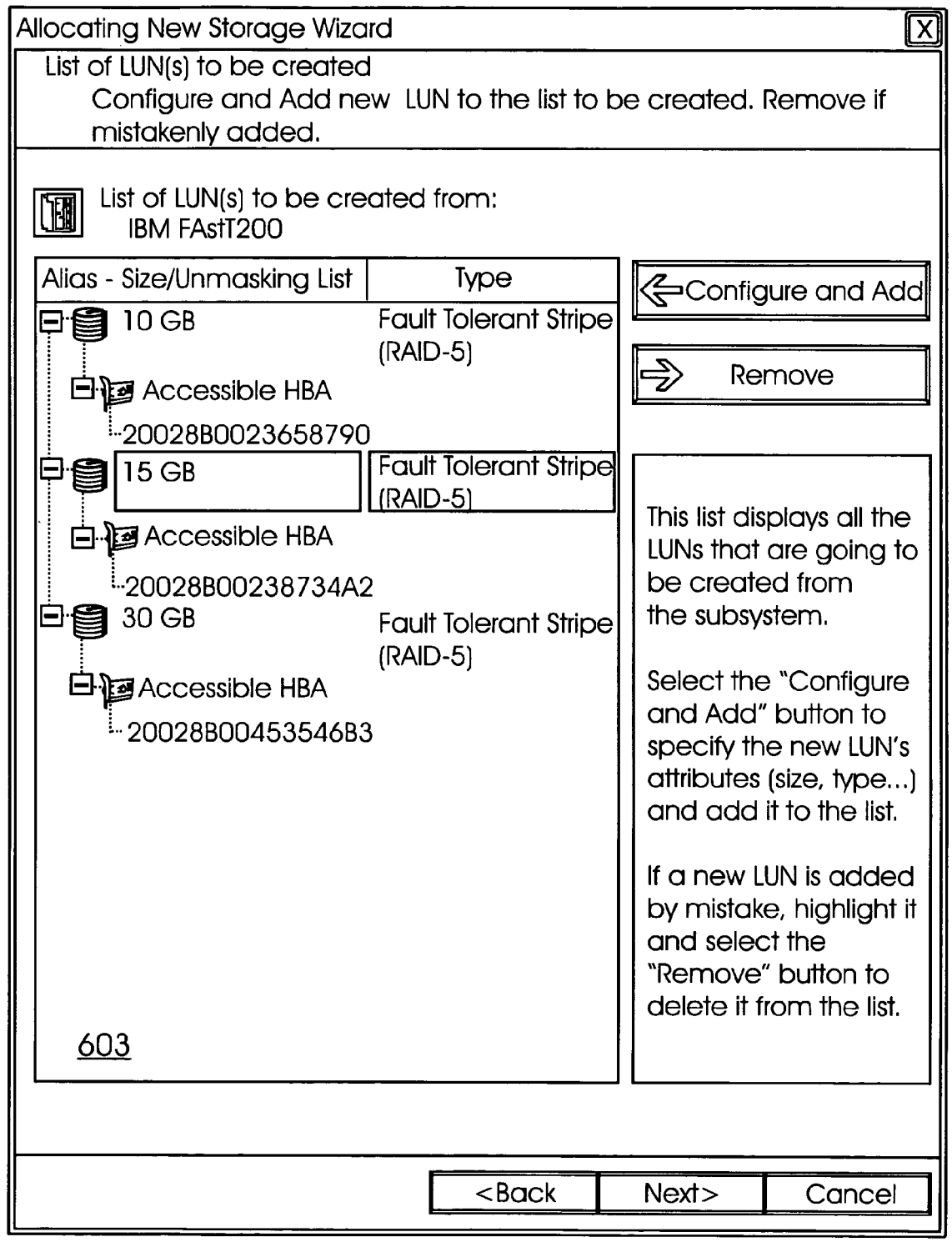

FIG. 6D shows the LUN listing with associated HBAs in window 603. FIG. 6E shows in window 604 the various LUNs that are created.

In one aspect of the present invention, boot server is easily accessible using a management application. Manual tedious entries are not required to create boot LUNs.

It is noteworthy that although the foregoing illustrations have been provided with respect to Fibre Channel based SANs, this concept of including the boot server information in a switch may be used in any other protocol as well.

Although the present invention has been described with reference to specific embodiments, these embodiments are illustrative only and not limiting. Many other applications and embodiments of the present invention will be apparent in light of this disclosure and the following claims.

What is claim is:

1. A method for re-booting a server operationally coupled to a network via an adapter, comprising:
   (a) accessing a boot server blade that is remote to the server, wherein the boot server blade is a switch that stores a boot server for re-booting the server and is coupled to the adapter,
      wherein the boot server includes:
         a list of worldwide port numbers that can be assigned to the adapter, and
         an active profile of the server, wherein the active profile allows for booting the server to a certain system profile,
   (b) registering a default world wide port number ("WWPN") with the boot server stored at the switch wherein the adapter registers with the boot server and provides the active profile;
   (c) determining that the adapter is already configured for re-booting;
   (d) sending a new WWPN to the adapter configured for re-booting the server; wherein the switch sends the new WWPN for re-booting the server based on the determination that the adapter is already configured for re-booting;
   (e) registering the new WWPN with a name server maintained by the switch;
   (f) querying the boot server for a list that includes a plurality of boot devices; wherein the adapter queries the switch for said list;
   (g) returning a list of boot devices to the adapter that the adapter is configured to use for re-booting the server, wherein the switch returns the list of boot devices in response to the query in step (f); and
   (h) using a boot device from the list of boot devices to perform a re-boot operation,
      wherein the boot device includes a logical storage structure for storing boot instructions that are used for re-booting the server.

2. The method of claim 1, wherein the adapter is a host bus adapter that registers the new WWPN sent by the switch.

3. The method of claim 2, wherein the host bus adapter uses the list of boot devices to configure a first available boot device from the list for the re-boot operation.

4. The method of claim 1, wherein the boot server includes a boot schedule for re-booting the server.

5. A system, comprising:
   a server operationally coupled to a network via an adapter; and
   a switch operational and accessible to the server via the network and the adapter,
      wherein the switch includes a storage medium storing a boot server that is used to boot the server;
         wherein the boot server stored at the storage medium includes:
            a plurality of world wide port numbers that can be assigned to the adapter,
            an active profile of the server, wherein the active profile allows for booting the server to a certain system profile, and
            a boot schedule including information of when the server needs to be re-booted, based on which the server is re-booted using the boot server, and
      wherein to re-boot the server, the adapter:
         accesses the switch;
         registers a default world wide port number ("WWPN") with the boot server stored at the switch,
            wherein the adapter registers with the boot server and provides the profile;
         receives a new WWPN from the switch,
            wherein the new WWPN is sent based on a determination that the adapter is already configured for rebooting;
         registers the new WWPN with a name server maintained by the switch;
         queries the boot server for a list that includes a plurality of boot devices;
            wherein the adapter queries the switch for said list;
            receives a list of boot devices from the boot server for the adapter to use for re-booting the server,
            wherein the switch returns the list of boot devices in response to the query; and
         uses a boot device from the list of boot devices to perform a re-boot operation,
            wherein the boot device stores a logical storage structure for storing boot instructions that are used for re-booting the server.

6. The system of claim 5, wherein the adapter is a host bus adapter (HBA) and the HBA uses the WWPN it received from the boot server to register with the name server and then query the boot server for the list of boot devices.

7. The system of claim 6, wherein if the adapter is not configured for the re-boot operation, then the switch sends a status indicating that the re-boot operation cannot be performed.

8. The system of claim 7, wherein the information registered with the boot server blade is used for another re-boot operation.

9. A system, comprising:
a server operationally coupled to a storage area network via an adapter;
a switch accessible to the server via the storage area network; and
a computing system, the computer system including a processor executing a management application for configuring the storage area network;
wherein the management application provides a graphical user interface to a user for creating a logical unit number ("LUN") and assigning the LUN to operate as a boot LUN;
wherein the boot LUN stores information for re-booting the server and is accessible via a boot server stored at a storage medium for the switch; and
wherein the boot server includes:
a list of worldwide port numbers that can be assigned to the adapter;
an active profile of the server, wherein the active profile allows for booting the server to a certain system profile, and
a boot schedule including information of when the server needs to be re-booted, and
wherein to re-boot the server, the adapter:
accesses the switch;
registers a default world wide port number ("WWPN") with the boot server stored at the switch,
wherein the adapter registers with the boot server and provides the profile;
receives a new WWPN from the switch,
wherein the new WWPN is sent based on a determination that the adapter is already configured for rebooting;
registers the new WWPN with a name server maintained by the switch;
queries the boot server for a list that includes a plurality of boot devices;
wherein the adapter queries the switch for said list;
receives a list of boot devices from the boot server for the adapter to use for re-booting the server,
wherein the switch returns the list of boot devices in response to the query; and
uses a boot device from the list of boot devices to perform a re-boot operation,
wherein the boot device stores the boot LUN with boot instructions for rebooting the server.

10. The system of Claim 9, wherein the adapter is a host bus adapter.

11. The system of claim 10, wherein the boot server is stored at a storage device other than the switch and is accessible to the switch.

12. The method of claim 1, wherein if the adapter is not configured for the re-boot operation, then the switch sends a status indicating that the re-boot operation cannot be performed.

13. The method of claim 12, wherein the information registered with the boot server blade is used for another re-boot operation.

14. The system of claim 9, wherein if the adapter is not configured for the re-boot operation, then the switch sends a status indicating that the re-boot operation cannot be performed.

15. The system of claim 14, wherein the information registered with the boot server is used for another re-boot operation.

* * * * *

UNITED STATES PATENT AND TRADEMARK OFFICE
CERTIFICATE OF CORRECTION

| | | |
|---|---|---|
| PATENT NO. | : 7,930,377 B2 | Page 1 of 1 |
| APPLICATION NO. | : 10/957465 | |
| DATED | : April 19, 2011 | |
| INVENTOR(S) | : Shishir Shah et al. | |

It is certified that error appears in the above-identified patent and that said Letters Patent is hereby corrected as shown below:

On the face page, in field (56), under "Other Publications", in column 2, line 1, delete "(2004)434," and insert -- (2004), 434, --, therefor.

On page 5, under "Other Publications", in column 2, line 44, delete "al al." and insert -- et al. --, therefor.

On page 5, under "Other Publications", in column 2, line 66, delete "Mangement" and insert -- Management --, therefor.

On page 6, under "Other Publications", in column 1, line 5, delete "Sytem" and insert -- System --, therefor.

On page 6, under "Other Publications", in column 1, line 12, delete "Sytem" and insert -- System --, therefor.

On page 6, under "Other Publications", in column 1, line 18, delete "Subsciption" and insert -- Subscription --, therefor.

In column 1, line 7, after "priority" delete ".".

In column 4, line 11, delete "program," and insert -- program. --, therefor.

In column 7, line 61, in Claim 1, delete "switch" and insert -- switch, --, therefor.

In column 10, line 20, in Claim 10, delete "Claim" and insert -- claim --, therefor.

Signed and Sealed this
Ninth Day of August, 2011

David J. Kappos
*Director of the United States Patent and Trademark Office*